US009943817B2

(12) United States Patent
Christel et al.

(10) Patent No.: US 9,943,817 B2
(45) Date of Patent: Apr. 17, 2018

(54) PROCESS AND APPARATUS FOR DIRECT CRYSTALLIZATION OF POLYMERS UNDER INERT GAS

(71) Applicant: Bühler Thermal Processes AG, Oberbüren (CH)

(72) Inventors: Andreas Christel, Zuzwil (CH); Brent Allan Culbert, Wil (CH); Fernando Eusebio, Uttwil (CH)

(73) Assignee: POLYMETRIX AG, Oberbüren (CH)

( * ) Notice: Subject to any disclaimer, the term of this patent is extended or adjusted under 35 U.S.C. 154(b) by 364 days.

(21) Appl. No.: 14/032,357

(22) Filed: Sep. 20, 2013

(65) Prior Publication Data
US 2014/0084504 A1    Mar. 27, 2014

(30) Foreign Application Priority Data
Sep. 26, 2012   (EP) ..................................... 12186020

(51) Int. Cl.
*B01J 2/00*   (2006.01)
*C08J 3/12*   (2006.01)
(Continued)

(52) U.S. Cl.
CPC .................. *B01J 2/00* (2013.01); *B29B 9/065* (2013.01); *B29B 9/16* (2013.01); *C08G 63/88* (2013.01);
(Continued)

(58) Field of Classification Search
CPC .............................................. B29B 2009/165
See application file for complete search history.

(56) References Cited

U.S. PATENT DOCUMENTS 3,544,525 A    12/1970   Balint et al.
5,041,251 A *  8/1991   McCoskey .............. B29B 9/065
                                                  264/130
(Continued)

FOREIGN PATENT DOCUMENTS

CN    101230130 A    7/2008
DE    1905677        10/1969
(Continued)

OTHER PUBLICATIONS

Scheirs/Long (eds.), Modern Polyesters: Chemistry and Technology of Polyesters and Copolyesters, Wiley Series in Polymer Science, 2003, pp. 31-115 and 143-194, John Wiley & Sons Ltd., West Sussex, England.
(Continued)

*Primary Examiner* — Ryan M Ochylski
(74) *Attorney, Agent, or Firm* — Davis & Bujold PLLC; Michael J. Bujold (57) ABSTRACT

An apparatus for continuous pelletization and crystallization of a polymer includes a unit for forming a polymer pellet material and cooling the pellet material in a liquid cooling medium. An after-connected drying unit has an exit opening for exporting gas and a crystallizer for crystallizing the pellet material. The crystallizer communicates via a connection line with the pre-connected unit for separating the liquid cooling medium from the pellet material and drying the pellet material. The crystallizer communicates with an inert gas tank, whereby the pressure in the crystallizer can be increased relative to the pressure in the drying unit. A related process is also disclosed.

20 Claims, 1 Drawing Sheet

(51) Int. Cl.
  *B29B 9/06* (2006.01)
  *C08G 63/88* (2006.01)
  *B29B 9/16* (2006.01)
  *B29B 9/12* (2006.01)

(52) U.S. Cl.
  CPC .................. *C08J 3/124* (2013.01); *B29B 9/06* (2013.01); *B29B 9/12* (2013.01); *B29B 2009/165* (2013.01); *B29B 2009/168* (2013.01)

(56) References Cited

U.S. PATENT DOCUMENTS

| 5,750,644 A | 5/1998 | Duh |
| 2009/0218052 A1* | 9/2009 | DeBruin .................. B29B 9/16 159/47.1 |

FOREIGN PATENT DOCUMENTS

| DE | 102004015515 | 9/2004 |
| DE | 10349016 | 6/2005 |
| DE | 102006058642 | 6/2008 |
| EP | 0541674 | 5/1993 |
| EP | 0864409 | 9/1998 |
| WO | 2005/092949 | 10/2005 |
| WO | 2006/060930 | 6/2006 |
| WO | 2007/022994 | 3/2007 |
| WO | 2008/071023 | 6/2008 |
| WO | 2008/071278 | 6/2008 |

OTHER PUBLICATIONS

Chinese Office Action corresponding to CN Application No. 201310450617.9 dated Dec. 2, 2016.

* cited by examiner

PROCESS AND APPARATUS FOR DIRECT CRYSTALLIZATION OF POLYMERS UNDER INERT GAS

The present invention relates to a process and apparatus for direct crystallization of polymers, especially polyesters such as polyethylene terephthalate (PET), under an inert gas.

The production of certain high molecular weight polymers, especially polycondensates such as polyesters, is not possible via melt polycondensation, since the excessive thermal stress associated therewith is responsible for product degradation and an unacceptable contamination with by-products. Therefore, prepolymers having a comparatively low molecular weight are produced via melt polycondensation. The prepolymers are subsequently raised to the desired molecular weight in a solid-state polymerization (SSP). This procedure is known from the prior art (e.g., Scheirs/Long (eds.), Modern Polyesters, Wiley 2003, chapter 4, pp. 143 ff.).

The prepolymer obtained by melt polycondensation is processed into a pellet material for the SSP reaction. To avoid agglomeration of the pellets under the conditions of the SSP reaction due to stickiness, the pellet material is partly crystallized prior to the SSP reaction. This is also known from the prior art (e.g., Scheirs/Long (eds.), Modern Polyesters, Wiley 2003, chapter 4, pp. 158-164).

Usually, the prepolymer is cooled down after it has been formed into pellets and reheated for the crystallization. However, processes are also known from the prior art wherein the as-formed pellet material is fed in the hot state to the crystallization stage without cooling down in-between. Processes of this type are known as direct-crystallization processes. DE 103 49 016 and DE 10 2004 015 515, for example, describe so-called latent heat crystallization processes wherein crystallization is effected using solely the intrinsic heat of the pellets. But these processes have the disadvantage that they are unable to meet the required flexibly adjustable and homogeneous quality of the output with regard to temperature and crystallinity. The frequent formation of agglomerates in the upstream-end region of the crystallization zone is a further disadvantage because they do not always break up again completely.

Better results are obtainable when the crystallization of the still hot pellets is effected by additional heating with a hot process gas.

WO 2008/071023 describes a process wherein still hot pellet material is separated from the cooling medium in a pellet dryer and subsequently transferred into a crystallizer where it is treated under defined conditions. Both the pellet dryer and the crystallizer are operated here under an air atmosphere. Evaporated cooling medium can be removed by means of air.

However, crystallization is not always possible under an air atmosphere, since oxidative degradation can occur at the high temperatures of crystallization. With certain materials/quality requirements, therefore, it is necessary to crystallize under an inert gas atmosphere.

U.S. Pat. No. 3,544,525 describes a process wherein polymer melt is formed into a prepolymer pellet material via an underwater pelletization. The pellet material is subsequently dried in a dewatering unit (pellet dryer) and transferred into a crystallization device where it is crystallized with hot inert gas.

This process has various disadvantages. In addition to crystallization control and homogeneity being unsatisfactory, the design of the pellet dryer as a closed system causes an overpressure to develop therein due to the evaporating cooling liquid (water). As a consequence, the water is forced out of the pellet dryer and into the crystallizer and carried into the adjoining SSP reactor. Although the prepolymer is described as relatively dry in U.S. Pat. No. 3,544,525 after passing through the pellet dryer, the SSP reactor nonetheless has a high moisture content which is absorbed by the process gas flowing through the SSP reactor. Before returning into the SSP reactor, the process gas has to be freed of water in additional units (a condenser and a dryer), which is inconvenient. Alternatively, the moist process gas can be disposed of and replaced with fresh dry process gas. This variant is costly and hence unsatisfactory. In addition, the high moisture content of the SSP reactor causes the pellets to cool down, since the water adheres to the pellets and has to be condensed off. More process gas is accordingly needed in the SSP reactor to achieve the desired reaction temperature, and this is economically disadvantageous.

The problem addressed by the present invention was that of providing a process and apparatus for direct crystallization of polymer under an inert gas which do not have the disadvantages of the prior art.

It was found according to the present invention that, surprisingly, the disadvantages of the prior art are overcome when a pressure which is higher than the pressure in the pellet dryer is set in the crystallizer.

The present invention relates to an apparatus for continuous pelletization and crystallization of a polymer, comprising a unit for forming a polymer pellet material and cooling the pellet material in a liquid cooling medium, an after-connected unit for drying the pellet material, wherein this unit comprises an exit opening for exporting gas, preferably air, a crystallizer for crystallizing the pellet material, wherein the crystallizer communicates directly via a connection line with the pre-connected unit for separating the liquid cooling medium from the pellet material and drying the pellet material, so that the material to be treated can pass unimpeded from the pre-connected unit to the downstream unit, and comprises an inlet and preferably an outlet (6a) for importing and exporting inert gas, characterized in that the crystallizer communicates via the inlet with an inert gas tank, whereby the pressure in the crystallizer can be increased relative to a pressure in the unit for drying the pellet material.

According to the present invention, the apparatus preferably further comprises a control unit for setting a pressure in the crystallizer, wherein the pressure in the crystallizer can be increased relative to an ascertained pressure in the unit for drying the pellet material.

According to the present invention, a "pre-connected" unit is to be understood as meaning a unit which, in the operative processing stream of the apparatus, is disposed upstream of a subsequent unit and is in direct communication therewith and/or ensures that the material to be treated can pass unimpeded from the pre-connected unit to the downstream unit.

According to the present invention, an "after-connected" unit is to be understood as meaning a unit which, in the operative processing stream of the apparatus, is disposed downstream of a previously disposed unit and is in direct communication therewith and/or ensures that the material to be treated can pass unimpeded from the previously disposed unit to the after-connected unit.

The present invention further relates to a process for continuous production of partly crystalline polymer pellet material, comprising the steps of a) forming a polymer melt into pellet material by adding a liquid cooling medium and cooling to a temperature above the glass transition temperature of the polymer before or during or after forming;

b) separating the liquid cooling medium from the pellet material in a first treatment space at a temperature above the glass transition temperature of the polymer in a gas phase, preferably air, wherein cooling medium separated off transitions into the gas phase, c) crystallizing the pellet material in an after-connected second treatment space under an inert gas, characterized in that the pellets is directly transferred from the first treatment space into the second treatment space via a connection line, so that the material to be treated can pass unimpeded from the pre-connected unit to the downstream unit, and the pressure p2 in the second treatment space is set to be above the pressure p1 in the first treatment space.

The present invention is provided for treating crystallizable polymers, preferably polycondensates. Suitable polycondensates include crystallizable thermoplastic polycondensates, for example polyamides, polyesters, polycarbonates, polyhydroxyalkanoates, polylactides or their copolymers, which are obtained via a polycondensation reaction by eliminating a low molecular weight reaction product. The polycondensation in question can take place directly between the monomers or via an intermediate stage which is subsequently converted by transesterification, in which case the transesterification can in turn take place by eliminating a low molecular weight reaction product or via ring-opening polymerization. Essentially, the polycondensate thus obtained is linear, wherein a low number of branching can be generated.

A polyamide is a polymer obtained via polycondensation from its monomers, either a diamine component and a dicarboxylic acid component or a bifunctional monomer with an amine end group and a carboxylic acid end group. A polyester is a polymer obtained via polycondensation from its monomers, a diol component and a dicarboxylic acid component. Various, usually linear or cyclic diol components are used. Similarly, various, usually aromatic dicarboxylic acid components can be used. The dimethyl ester of the dicarboxylic acid can also be used instead of the dicarboxylic acid itself.

Typical examples of polyesters are polyethylene terephthalate (PET), polybutylene terephthalate (PBT) and polyethylene naphthalate (PEN), which are each used either as homopolymer or as copolymers. According to the present invention, the comonomer content of polyesters used is less than 15%, preferably less than 10%.

The polyethylene terephthalate is obtained from its monomers, a diol component and a dicarboxylic acid component, the diol components consisting mainly of ethylene glycol (1,2-ethanediol) monomer and the dicarboxylic acid components consisting mainly of terephthalic acid monomer. Possible comonomers include further linear, cyclic or aromatic diol and dicarboxylic acid component compounds. Typical comonomers are diethylene glycol (DEG), isophthalic acid (IPA) or 1,4-bishydroxymethylcyclohexane (CHDM).

Polyhydroxyalkanoates are polymers obtained via polycondensation from their monomers having the general formula $HO—CH(R)—(CH_2)_n—COOH$, where R is usually an aliphatic hydrocarbon of 1 to 15 carbon atoms and n=1 to 10, usually 1 to 3. A typical example is polyhydroxybutyrate where $R=CH_3$ and $n=1$.

Polylactides (known as polylactic acid, PLA) are polymers obtainable directly from lactic acid by water elimination or from lactic acid cyclic dimers (lactides) by ring-opening polymerization.

The polycondensate can be virgin material or a recyclate. Recyclates are reprocessed polymers from the production and processing operations (post industrial) or polymers collected and reprocessed after having been used by consumers (post-consumer).

Additives may be incorporated in the polymer. Suitable additives include, for example, catalysts, dyes and pigments, UV blockers, processing aids, stabilizers, impact modifiers, blowing agents of the chemical and physical kinds, fillers, nucleating agents, flame retardants, plasticizers, particles to improve the barrier or mechanical properties, reinforcing articles, such as balls or fibres, and also reactive substances, for example oxygen absorbers, acetaldehyde absorbers or molecular weight enhancers.

The unit which is used in the present invention for forming a polymer pellet material is fed with a polymer melt as starting material. The polymer melt is produced using reactors or devices known in the prior art (e.g., Scheirs/Long (eds.), Modern Polyesters, Wiley 2003, especially pp. 31-104). In-principle possibilities include polymerization reactors in which the polymers are produced in the liquid phase, for example stirred tanks, cage reactors or disc reactors, or else equipment where previously produced polymers are melted, for example extruders or kneaders. Polymer melt production can be continuous or batchwise. However, continuous processes are preferable for further processing.

Individual strands of polycondensate are formed from the polycondensate melt in an exit apparatus, especially a die or die-plate. To produce pellets (i.e. particles of defined shape and size) from the strands of polycondensate, the pelletization techniques known in the prior art, such as strand pelletization, water-ring pelletization, underwater pelletization or hot face pelletization, can be used. In pelletization, the strands of polycondensate which exit from the melt channels are solidified and separated into a multiplicity of individual pellets before or after solidification. Separation is effected, for example, by autogenous dropletization, by the use of a liquid shearing medium or by mechanical severing, especially cutting. While dropletization, whether autogenous or forced by a shearing medium, takes place at the die exit, cutting can not only take place directly at the die exit, but also only after passage through a treatment sector.

The polycondensate melt is solidified by cooling with one or more cooling fluids which, according to the present invention, may comprise gaseous cooling media (e.g. air, nitrogen or $CO_2$) or liquid cooling media (e.g. water or ethylene glycol) or a combination thereof. At least a liquid cooling medium is used according to the present invention. The polycondensate, especially in the form of polycondensate strands or in the form of droplets, can, for example before entry into the liquid cooling medium, flow through a sector which contains a process gas, especially air or water mist. Notwithstanding the use of the term "water" in the designation of pelletizing means, other liquid media can also be used. Cooling can take place according to the present invention before, during or after the forming of the material into pellets.

The pellets obtained in this way shall preferably have a defined pellet shape, for example cylinder-shaped, sphere-shaped, droplet-shaped, sphere-like or a designed shape as proposed in EP 0 541 674 for example. Average pellet size shall be between 0.1 mm and 10 mm, preferably between 0.5 mm and 3 mm and especially between 0.85 mm and 2.5 mm.

According to the present invention, the pellet material obtained is subjected to direct crystallization, i.e. the pellet material is not cooled down so severely (to room temperature, for example) that for a subsequent crystallization it would have to be heated with high energy requirements. According to the present invention, the pellet material is cooled down to a temperature which is above its glass transition temperature (stickiness temperature). The pellet material of polyesters starts to tackify, i.e. the particles stick to one another to form agglomerates, at above the glass transition temperature of the polyester material. The glass transition temperature of polyethylene terephthalate is about 75° C., for example.

Preferably, however, the polycondensate pellets are cooled down to an average temperature which is within the crystallization temperature range of the polycondensate. This is achieved by raising the temperature of the cooling medium and/or choosing a correspondingly short residence time for the pellet material in the cooling medium. Concurrently with the cooling, the polycondensate pellets can be conveyed into a further processing step.

The suitable range of temperature for the crystallization becomes apparent on plotting the crystallization half time ($t^{1/2}$) as a function of the temperature. Said range is upwardly and downwardly limited by the temperature at which the crystallization half time is approximately equal to 10 times the minimum crystallization half time. Since very short crystallization half times are very difficult to determine, 1 minute is used as minimum value. In the case of polyethylene terephthalate, the crystallization temperature range is between 110 and 220° C.

The crystallization half time $t^{1/2}$ is determined by isothermal crystallization in the DSC, $t^{1/2}$ corresponding to the time which, at a given temperature, is needed after the induction time to attain 50% of the attainable crystallinity.

In the case of polyethylene terephtate (PET) as preferred polymer for treatment, the pellet material is cooled down to a temperature in the range from 100 to 180° C., preferably from 110 to 160° C. and more preferably from 120 to 150° C.

After cooling, the cooling medium is separated from the pellets. Optionally, the pellets are subjected to a further treatment (conditioning) in a liquid medium, for which directly the cooling medium or some other liquid can be used.

The pellets can be separated from a liquid cooling medium using separating apparatuses known in the prior art. They may merely be passive separating apparatuses, for example grids or grills, through which the cooling medium can pass but not the pellet material. Active separating apparatuses are usually used for at least part of the separation, the separation being effected for example due to a gas through-flow, a centrifugal force or an impact. Apparatuses of this type are known for example as suction apparatuses, impact dryers or centrifugal dryers.

According to the present invention, the pellet material is subjected to a drying step in order that the cooling medium may be completely separated from the pellet material. For this, the pellet material is transferred from an above-described unit for forming the pellet material via a connection line into a unit for drying the pellet material. The transfer of the pellet material into the drying unit is effected at such a rate of speed that the pellet material does not cool down below its glass transition temperature. The flow velocity of the pellet material in the connection line can be increased by importing air or some other suitable gas (preferably an inert gas such as nitrogen) into the connection line.

Units for drying a pellet material (pellet dryers) are known from the prior art. The preference of the present invention is for using a reactor in which a first treatment space is provided. Inside the reactor, the cooling medium (generally water) is separated off and, in the first treatment space, the pellet material separated off is dried by evaporating the cooling medium. To evaporate the cooling medium, a temperature in the range from 100 to 180° C., preferably from 110 to 160° C. and more preferably from 120 to 150° C. is applied to the first treatment space. The residence time of the pellet material in the first treatment space is preferably in the range from one tenth of a second up to 10 seconds.

The pellet dryer of the present invention has at least one feed-in opening for importing the pellet material into the unit. The feed-in opening can be for example an opening in the housing, or the point of exit from a pipe leading into the housing. The pellet dryer of the present invention further has at least one discharge opening for exporting the pellet material out of the unit. The discharge opening can be for example an opening in the housing or the point of entry into a pipe leading out of the housing.

A gas phase is present in the first treatment space and absorbs the evaporating cooling medium. According to the present invention, the gas is preferably air. But other gas mixtures having a lower oxygen content than air can also be used. An inert gas need not be used. In exemplary embodiments, the oxygen content of the first treatment space can be more than 1% by weight, preferably more than 5% by weight and more preferably more than 10% by weight. To avoid oxidative degradation of the material, however, the oxygen content of the first treatment space should not exceed the oxygen content of air (around 21%).

The drying unit of the present invention, in contradistinction to the corresponding unit of U.S. Pat. No. 3,544,525, is not a closed unit. The drying unit of the present invention has at least one exit opening for exporting gas, preferably air. In a preferred embodiment of the present invention, the exit opening of the drying unit empties into a gas exportation line which accommodates a ventilator for air circulation through the drying unit.

The drying unit of the present invention may further have at least one entry opening for importing gas, preferably air. The entry opening in this case is disposed at the opposite end of the first treatment space from the exit opening in order that complete flow of gas through the first treatment space may be ensured. However, it is also possible for the entry opening for importing gas to be disposed in the connecting unit immediately downstream of the drying unit and not in the drying unit itself.

In a preferred embodiment of the present invention, the gas passes to the entry opening via an aspirating filter. A ventilator for air circulation through the drying unit can be disposed in the gas line leading to the entry opening. This ventilator can be provided in addition to or in place of the ventilator in the gas exportation line. In a preferred embodiment of the present invention, therefore, a ventilator is only provided in the gas importation line.

In a further embodiment of the present invention, the line leading to the entry opening and the line leading away from the exit opening can communicate with each other to form a closed-loop circuit. In this embodiment, however, the gas first has to pass through a condenser before re-entry into the first treatment space in order that the evaporated cooling medium in the gas may be separated off.

The apparatus of the present invention preferably has a cooling-medium circuit. The cooling medium is fed from a stock reservoir vessel (tank), preferably via a circulating pump and optionally a heat exchanger (for selectively heating or cooling the cooling medium), into the forming unit (pelletization apparatus). The cooling medium separated off in the drying unit can be led back into the stock reservoir vessel via a pipework line.

Given a constant ratio of air importation and exportation, a pressure increase will occur in the first treatment space during the drying operation, since the liquid cooling medium transitions into the gaseous state and the gas phase in the first treatment space increases.

Separation of the polycondensate pellets from the liquid cooling medium is followed by a direct transfer into the subsequent second treatment space for crystallization. This, according to the present invention, is accomplished by means of a connection line which is disposed between the drying unit and the crystallizer and connects the discharge opening of the drying unit to the inlet opening of the after-connected crystallizer. The connection line is configured such that the material to be treated can pass unimpeded from the pre-connected unit to the downstream unit. There are accordingly no close-out apparatuses in the connection line. This is intended to rule out the risk of the hot, tacky particles of the polymer adhering in the connection line. The connection line can have a gas inlet.

Constant relative movement between the individual pellets should be ensured in the connection line in order that their agglomeration due to stickiness may be prevented. The relative movement is achievable, for example, via a high flow velocity in the connection line (greater than 0.3 m/min, especially greater than 1 m/min), via an encircling flow with a conveying gas, via mechanical movement, for example using a stirrer or conveying screw, or by generating a vibration or oscillation.

In order that, in the event of a system upset of the crystallizer, inconvenient and costly exportation of material may be avoided, the connection line of the present invention can, as described in WO 2008/071278, communicate with an intermediate store into which the material is passed by a controlling apparatus in the event of a system upset and is stored therein under conditions (especially pellet temperature below pellet glass transition point) where agglomeration of the pellets does not occur. The corresponding content of WO 2008/071278 is hereby expressly incorporated herein by reference.

As the pellet material to be treated enters the crystallizer it is in general essentially amorphous, i.e. its crystallinity is less than 10%, preferably less than 5%. According to the present invention, pellet material made of polyethylene terephthalate (PET) preferably has an IV value of 0.6 to 0.8 dl/g, especially 0.65 to 0.75 dl/g, before entry into the crystallizer. The IV value indicates the intrinsic viscosity of a polymer and is a measure of its molecular weight. The IV value and its determination are known from the prior art.

According to the present invention, the polycondensate pellets flow essentially downwardly through the second treatment space for crystallization, while an inert gas preferably flows upwardly through the second treatment space. Polymer particle movement in the crystallizer is due to mechanical movement or preferably due to the stream of inert gas. The crystallizer of the present invention can be operated as a moving bed or as a whirling bed, in counter-current flow or cross flow.

The second treatment space for crystallization is surrounded by a housing. The horizontal cross section of the treatment space can have any desired shape, but preferably is round or rectangular. The disposition of the treatment space is essentially vertical, so the pellet material can flow downwardly through the apparatus. It is important here to achieve a product flux which is uniform. The second treatment space is laterally limited by a casing. The casing wall can consist of cylindrical or conical segments or of a combination of conical and cylindrical segments, whereby the gas speed distribution can be influenced via the height of the apparatus. Widening in the ceiling region facilitates a reduction in the gas speed to prevent the discharge of pellets. Narrowing in the ceiling region facilitates an increased gas speed, leading to greater swirling to prevent any sticky agglomerations.

One particular embodiment of the present invention provides an at least approximately rotationally symmetrical housing casing, which results in fabrication advantages as well as advantages in respect of regularity of product flux.

In the interior of the second treatment space a displacer can be provided which does not have pellet material flow through it and accordingly reduces the size of the second treatment space. Displacers of this type can be used for example for routing of inert gas, for adjusting the free cross-sectional area or for improving pellet flux.

At least one feed opening empties into the ceiling region of the second treatment space and facilitates the importation into the second treatment space of the pellet material to be treated. The feed opening can be for example an opening in the housing, or the exit from a pipe leading into the housing. The feed opening can be subdivided into two or more segments, which enables disbursement of the pellets in the treatment space.

At least one discharge opening empties into the lower part of the second treatment space and the treated pellet material can be discharged therethrough from the treatment space. The discharge opening can be for example an opening in the housing or the entry into a pipe leading out of the housing. Usually, the pellet material travels in the direction of the discharge opening through a conical region. The angle of the outflow cone with the horizontal is preferably 50-80° when the pellet material is not fluidized or oscillated in the discharge cone and 15-60°, especially 30-50°, when the pellet material is fluidized or oscillated in the discharge cone. Alternatively, the pellet material can also be fed in the direction of the discharge opening via a mechanical discharge apparatus, for example a screw. A blocking element, for example a cellular wheel lock, a horizontally disposed discharge roll or an automatic gate valve, can be situated underneath the discharge opening and is used to control the efflux of pellet material out of the treatment space. The controlled variable here can be, for example, the fill height of the pellet material in the treatment space or the weight of the pellets in the apparatus.

The basal region of the treatment space preferably locates one or more than one importing means for an inert gas. The importing means has at least one entry opening wherethrough the inert gas flows into the second treatment space.

The feed means for an inert gas may comprise apparatuses, for example open-base cones or series of ridge structures, or else lines or metal sheets with exit holes, as long as distribution of the inert gas is sufficiently uniform. In one particular embodiment, the treatment space is downwardly limited by an at least to some extent gas-permeable barrier means, especially a perforated metal sheet with a multiplicity of entry openings wherethrough inert gas can flow in some places at least, but pellets cannot. To this end, the openings are smaller than the diameter of the pellets. The permeable area is preferably between 1% and 30%. Preference is given to openings at between 20 and 90%, especially between 30 and 80%, of the diameter of the pellets. The number, size and arrangement of the openings here can be uniform or non-uniform. The disposition of the barrier means is conical or horizontal.

Underneath the barrier means there can be a distributor space wherethrough inert gas is conducted to the barrier apparatus. At least one opening for importing inert gas empties into this distributor space. There can further be apparatuses for distributing the inert gas, such as baffle plates, valves or flaps, or else separate channels for individual importation of inert gas. Alternatively, the treatment space can be downwardly limited by a non-gas-permeable barrier means. In this case, the at least one importing means for an inert gas can be an opening in the housing, the exit from one or more pipes leading into the housing, or a single ridge structure or a series of ridge structures, these having either holes or open bases. Any displacer here can be used for gas importation.

In one particular embodiment of the present invention, there is, in addition to the at least one feed means for inert gas in the basal region of the second treatment space, at least one further inert gas importation means which empties into the second treatment space, whereby a multi-stage heat supply as well as a multi-stage gas speed profile is achievable.

The ceiling region of the second treatment space preferably comprises at least one removal means for the inert gas. The removal means can be for example an opening in the housing or the entry into a pipe leading out of the housing. The removal means in question can be situated in the casing or ceiling of the treatment space. In an alternative embodiment of the invention, no such removal means is provided. In this case, the inert gas leaves the second treatment space through the connection line from the first to the second treatment space. There can be apparatuses within or underneath the removal means to permit the passage of inert gas but prevent the passage of pellets. This can be effected for example with the aid of a curved or deflected through-flow channel or with the aid of deflecting internals, for example a zig-zag separator.

The pellet material is heated in the second treatment space by supply of energy from the outside, preferably with the aid of the hot inert gas, preferably by not less than 20° C. Preferably, therefore, the inert gas is conducted into the second treatment space at a temperature which is above the average pellet temperature of the polycondensate pellets on entry into the second treatment space, the resulting advantage being that the polycondensate pellets can be set to a constant and defined exit temperature. According to the present invention, pellet material made of polyethylene terephtalate (PET) is preferably heated in the second treatment space (i.e. in the crystallizer) to a temperature in the range from 140 to 220° C.

According to the present invention, the residence time of the material is preferably in the range from 1 to 30 crystallization half times. In the case of a rapidly crystallizing polymer such as polyethylene terephthalate (PET) having a comonomer content of less than 5%, the residence time is accordingly in the range from 1 to 30 minutes. Slow-crystallizing polymers accordingly have to be longer resident in the second treatment space until the desired increase in crystallinity has been attained.

According to the present invention, the crystallization in the crystallizer is effected with an inert gas as process gas, in contrast to conventional processes. Use of nitrogen is preferred. According to the present invention, the oxygen content of the gas in the second treatment space shall be less than 1% by weight, preferably less than 0.5% by weight and more preferably less than 0.1% by weight in order to reduce/avoid oxidative damage to the material under the conditions of the crystallization.

Since inert gases such as nitrogen are costly, the invention provides that the gas used in the crystallizer is preferably routed at least partly in a circuit system where a small amount of exchange gas can be imported and a small amount of exchange gas can be removed. In this preferred embodiment, there is a closed-loop circuit of pipework lines between the removal means and importation means for the inert gas.

The circuit may contain further units, for example compression means (e.g. ventilators, blowers or compressors), heat exchangers (e.g. heaters), barrier apparatuses (e.g. a valve or cock) or cleaning means (e.g. filters, cyclones, scrubbers or catalytic combustion means). Since a large proportion of the compression energy passes as heat into the gas stream, the elevated process gas temperature can also be maintained with less additional heater performance. However, if the entry temperature of the polycondensate pellets changes, this can be compensated by means of the additional heater performance. According to the present invention, the closed-loop circuit system preferably contains additional units selected from the group consisting of a ventilator, a heat exchanger such as a heater, a barrier apparatus, a condenser and a combination thereof.

According to the present invention, the crystallizer communicates with an inert gas tank. In a preferred embodiment of the present invention, there is a feed line with which inert gas can be fed from the inert gas tank into the circuit system of pipework lines or directly into the crystallizer. Preferably, a metering unit, for example a control valve, is disposed in this feed line and can be used to control the importation of inert gas.

According to the present invention, the pressure p2 in the second treatment space is set to be above the pressure p1 in the first treatment space. This prevents cooling medium transitioning from the first treatment space in the dryer into the second treatment space in the crystallizer. Owing to the higher pressure in the second treatment space, inert gas does transition from the second treatment space into the first treatment space. However, it has transpired that it is sufficient for the purposes of the present invention when $p1<p2<p1+100$ mbar, preferably $p1<p2<p1+50$ mbar, i.e. the pressure in the second treatment space is less than 100 mbar, preferably even less than 50 mbar, above the pressure in the first treatment space. In other words, a slightly higher pressure in the second treatment space relative to the first treatment space is surprisingly sufficient to achieve the object of the present invention. Under these pressure conditions, only a small proportion of inert gas is lost by transitioning into the first treatment space. This small disadvantage is more than compensated by the low moisture level in the crystallizer and the associated advantages with regard to equipment design and process engineering (smaller amount of inert gas needed in the crystallizer, inert gas needs minimal or no drying).

The apparatus of the present invention in one preferred embodiment comprises sensors to determine the pressure in the first and second treatment spaces. Conventional pressure sensors can be used, according to the present invention. The sensors communicate with a control unit which can evaluate the data ascertained by the sensors. The control unit of the present invention is usually a computer having requisite components such as a central processing unit (CPU) and memories.

The control unit of the present invention preferably communicates with the metering unit in the feed line and polices the metering unit to control the amount of process gas fed to the circuit system of the crystallizer. If, for example, the control unit uses the pressure values transmitted by the sensors to ascertain a pressure increase in the first treatment space, the metering unit is opened to let such an amount of process gas pass into the circuit system that the desired higher pressure in the second treatment space becomes established. Similarly, in the event of a pressure decrease in the first treatment space, a metering unit which is situated in a separate let-off line and likewise communicates with the control unit and is controlled thereby opens to let off process gas out of the circuit system in order to prevent excess pressure in the second treatment space with an attendant excess transition of process gas from the second treatment space into the first. Alternatively, the desired pressure difference between the first and second treatment spaces can also be set by opening appropriate metering means to increase or reduce the air importation into the first treatment space and/or the air exportation from the first treatment space.

If the inert gas quantity needed to set the overpressure of the present invention in the second treatment space is known or has been ascertained, the apparatus of the present invention can also be operated without control unit by passing the requisite quantity of inert gas into the crystallizer. However, even in this case it is at least advisable to police the pressure conditions in the first and second treatment spaces by means of pressure sensors. A further alternative embodiment provides no gas outlet from the second treatment space. In this case, the passing of inert gas into the second treatment space will inevitably lead to an increased pressure in the second treatment space relative to the first treatment space. This, at a certain minimum pressure gradient, will lead to the inert gas transitioning from the second into the first treatment space and thereby, in accordance with the present invention, likewise prevents the ingress of water into the second treatment space.

Any energy loss in the crystallizer due to possible evaporation of cooling medium from the pellet material is kept very small by the present invention. According to the present invention, therefore, a small amount of process gas is needed to efficiently heat the pellet material to a temperature in the range from 180 to 200° C., which already corresponds substantially to the temperature to be applied in any subsequent aftertreatment stage. Additional energy becomes available through released heat of crystallization. According to the present invention, therefore, further heating of the pellet material in an aftertreatment stage subsequent to the crystallization is only required to a minimal extent, if at all.

On exit from the second treatment space the pellet material in the case of polyethylene terephthalate (PET) preferably has a crystallinity between 25 and 45%, especially between 30 and 40%.

In the present invention, the material obtained after the crystallization can be subjected to a further thermal treatment step, which is preferably selected from the group of a devolatilizing step, preferably a de-aldehydization step, and a solid-state polymerization (SSP). This thermal treatment step is carried out in a third treatment space, which is preferably situated in a separate reactor.

Both the devolatilization, preferably de-aldehydization, and the SSP reaction are known to a person skilled in the art and need not be further elucidated herein. According to the present invention, this thermal treatment is preferably carried out in a third treatment space in a gas phase of inert gas, and causes volatile components to evaporate from the polymer during the treatment and pass into the gas phase. Nitrogen is preferably used as the inert gas. According to the present invention, the oxygen content of the gas in the third treatment space shall be less than 0.1% by weight, preferably less than 0.05% by weight and more preferably less than 0.02% by weight in order to reduce/avoid oxidative damage to the material under the conditions of the crystallization.

Owing to the high temperature of the polymer entering the third treatment space, there is no need to pass very hot process gas into the third treatment space. Owing to evolving heat of crystallization, a temperature increase of 3 to 15° C., preferably of 5 to 15° C. and more preferably of 7 to 15° C. is generally observed in the third treatment space of the invention in the case of polyethylene terephthalate (PET). In the present invention, therefore, process gas passed into the third treatment space can in certain cases have a temperature below the temperature of the polymer particles in the third treatment space. The present invention accordingly ensures that a subsequent thermal treatment step can be carried out in an energy-efficient manner.

Similarly to the second treatment space, the flow of the inert gas in the third treatment space is preferably also in countercurrent to the stream of polymer particles. The same reactors can in principle be used in the thermal treatment as were described above for the crystallization, or other reactors conventionally used for this purpose. A conventional shaft reactor may be mentioned as an example.

The crystallized particles of polymer are transferred out of the crystallizer into the third treatment space in a known manner. For example, the particles can be pneumatically conveyed from the crystallizer through a barrier apparatus (lock) into the third treatment space. Depending on the speed of conveyance, the polymer particles in the case of polyethylene terephthalate (PET) can cool down by between 2 and 15° C., preferably between 3 and 15° C. and more preferably between 5 and 15° C. If necessary, the particles can be additionally heated in a known manner before entry into the third treatment space.

According to the present invention, the de-aldehydization of, for example, polyethylene terephthalate can take place at a temperature of 140 to 190° C. in the third treatment space. A temperature increase in the third treatment space of 3 to 15° C. is observed in the course of this de-aldehydization, for example.

According to the present invention, the SSP reaction of, for example, polyethylene terephthalate can take place at a temperature of 180 to 240° C., preferably 180 to 225° C. in the third treatment space. A temperature increase in the third treatment space of 3 to 15° C. is observed in the course of this SSP reaction, for example.

Conventional plants for producing high molecular weight and pure polymer products are simple to modify and optimize by taking cognisance of the concepts of the present invention. Conventional production processes for polymers via a direct crystallization with subsequent thermal aftertreatment are usually carried out by conducting at least the steps of pellet drying and direct crystallization in an atmosphere of air. In the case of a de-aldehydization as thermal treatment, processes under an inert gas atmosphere as well as processes under an air atmosphere are known from the prior art. The documents WO 2005/092949 A1, WO 2006/060930 A1 and WO 2007/022994 A1 are referenced by way of example.

As noted above, prior art processes of this type have particularly the following disadvantages: The thermal stability of latent heat crystallization (direct crystallization) is insufficient. Only comparatively low temperatures can be used in an air atmosphere because of the risk of oxidative damage to the material. As a result, the de-aldehydization cannot be carried out to a sufficient degree. Furthermore, additional undesired volatile products of scissioning are formed when crystallizing and thermally aftertreating in air. Finally, the moisture ingress into the crystallizer and reactor for thermal aftertreatment means that the energy balance of conventional processes has disadvantages, as described above.

The present invention provides a simple way of overcoming these disadvantages, by conducting the direct crystallization in an inert gas atmosphere at a pressure which is slightly elevated relative to the pressure in the preceding drying step.

A process of this type can be realized in conventional plants by revamping the existing crystallizer in the plant for operation with inert gas and additionally endowing the plant with a control unit of the present invention for correctly setting a pressure in the crystallizer.

In a possible alternative, the plant is fitted with a second crystallizer in addition to the existing crystallizer, this second crystallizer being equipped for operation with inert gas, and with a control unit of the present invention, for correctly setting a pressure in the crystallizer. For an operation with inert gas, the crystallizer should if necessary be endowed with an above-described closed-loop circuit system in order that the costly inert gas may be recycled and returned into the crystallizer. Preferably, the plant should also if necessary be endowed with a unit for feeding external heat into the crystallizer, for example with a heat exchanger to heat the inert gas.

In the case of a conventional plant where a thermal aftertreatment of de-aldehydization is carried out in an air atmosphere, the plant revamp according to the present invention preferably further comprises modifying the reactor for thermal aftertreatment such that this reactor is operated with inert gas. For an operation with inert gas, the reactor should if necessary be endowed with an above-described closed-loop circuit system in order that the costly inert gas may be recycled and returned into the reactor. Preferably, the plant should also if necessary be endowed with a unit for feeding external heat into the reactor, for example with a heat exchanger to heat the inert gas.

The present invention thus also relates to a process for retrofitting a plant for pelletization and crystallization of a polymer with a unit for drying the pellet material and a crystallizer, wherein the crystallization of the polymer in the plant takes place under air, comprising the steps of
a) modifying the existing crystallizer in the plant for operation with an inert gas or alternatively providing an additional crystallizer which is equipped for operation with an inert gas, and
b) additionally endowing the plant with a control unit for setting a pressure in the crystallizer, which control unit can be used to increase the pressure in the crystallizer relative to an ascertained pressure in the unit for drying the pellet material.

The present invention will now be further elucidated using a non-limiting drawing, where The sole drawing shows a schematic depiction of a preferred embodiment of an apparatus according to the present invention.

Figure 1:
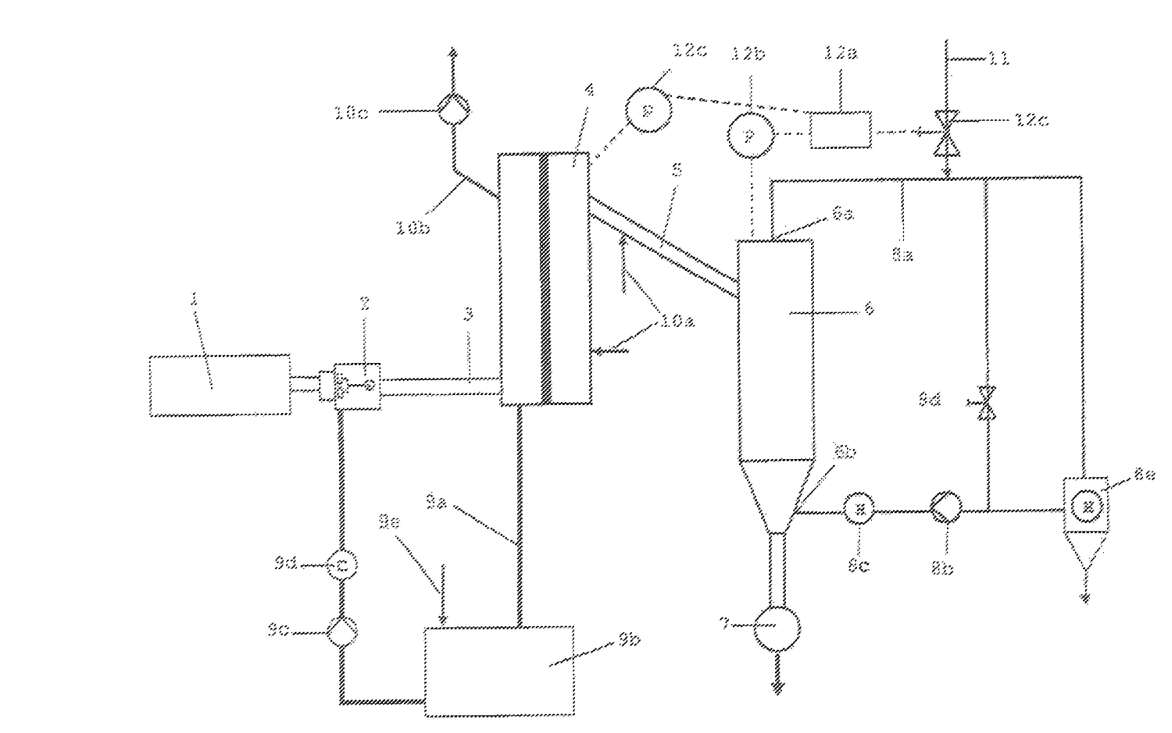

The apparatus according to the drawing has a reactor 1 for producing a polymer melt. This can be a reactor in which a melt polymerization is carried out to thus produce a prepolymer from the monomers. Alternatively, reactor 1 can also be an apparatus for melting a solid product, for example a prepolymer. Reactor 1 can in this case be an extruder for example.

The molten material is transferred into a pelletization apparatus 2. In the pelletization apparatus 2, a pellet material is produced from the molten material in a known manner. This may involve, for example, an underwater pelletizer (as shown in the drawing) or an underwater strand pelletizer. Pelletization takes place under water in this case. The pellets obtained are concurrently cooled down in pelletizer 2. As noted, however, cooling must not be so severe as to cool the pellets to below their glass transition point (i.e. below their glass transition temperature). This can be achieved via the use of heated water or via a reduced residence time for the pellets in pelletizer 2. The pellet material should in the case of polyethylene terephthalate (PET) be cooled to a temperature in the range from 100 to 180° C.

The pellet material is transferred via a connection line 3 directly into the unit for drying the pellet material (pellet dryer) 4. To stop the pellet material from cooling down too much, this pellet material should be conducted as quickly as possible through the connection line 3. Preferably, the flow velocity in connection line 3 can be increased by passing a gas stream (preferably air) into it.

The pellet material is separated from the liquid cooling medium (water) and dried in the unit for drying the pellet material (pellet dryer) 4. The cooling medium separated off is conducted via a pipework line 9a back into the stock reservoir vessel (tank) 9b for the cooling medium. The stock reservoir vessel 9b has an inlet 9e for importation of cooling medium. From the stock reservoir vessel 9b, the cooling medium is transferred into the pelletization apparatus 2 by means of a circulation apparatus (pump) 9c. In the course of the transfer, the cooling medium preferably traverses a heat exchanger 9d. In the heat exchanger 9d, the cooling medium can be heated or cooled down, as required. Especially cooling medium returned from the pellet dryer 4 can have an excessive temperature because of the contact with hot pellet material and has to be cooled before entry into the pelletization apparatus 2.

The drying of the pellet material in the first treatment space of unit 4 is effected at a temperature of 100 to 180° C. by means of air, or a gas atmosphere comprising essentially air, as well as a mechanical drying apparatus. In the apparatus of the drawing, the air is conducted into pellet dryer 4 via an air inlet 10a. The air inlet 10a can be situated in the housing of pellet dryer 4 or in the connection line 5 or in both locations. Optionally, an aspirating filter (not illustrated) can be disposed in the air inlet line 10a. The air leaves the pellet dryer 4 through the air outlet 10b. A ventilator 10c for circulating the air through the pellet dryer 4 is disposed in the air outlet line 10b in the apparatus of the drawing. However, the ventilator could alternatively also be disposed in the air inlet line 10a. Furthermore, air inlet 10a and air outlet 10b can be connected to each other to form a circuit system. A condenser would then have to be provided in this circuit system.

The pellet material is transferred from the dryer 4 via a connection line 5 directly into a crystallizer 6. To avoid pellet adherence and agglomeration, connection line 5 is not equipped with barrier apparatuses. The pellet material can transition unimpeded from dryer 4 into crystallizer 6.

In crystallizer 6, the essentially amorphous pellet material is at least partially crystallized. Within crystallizer 6, the pellets are kept moving by a gas stream passing through crystallizer 6. Within crystallizer 6, the conditions can be those of a moving bed or of a whirling bed. Alternatively, apparatus for mechanical movement of the particles could also be provided in crystallizer 6.

The pellets in the case of polyethylene terephthalate (PET) are crystallized at a temperature of 140 to 200° C. under an atmosphere comprising essentially nitrogen. The crystallized pellet material departs the crystallizer via a discharge apparatus 7, for example a barrier apparatus such as a cellular wheel lock. The pellets can be subjected to a subsequent thermal treatment such as a de-aldehydization or SSP reaction. Alternatively, the pellets can also be sent into a cooling step.

The inert gas used in crystallizer 6 is conducted through a closed-loop circuit system of pipework lines 8a. The inert gas enters crystallizer 6 through an inlet 6a and departs crystallizer 6 through the outlet 6b. The circuit system for the inert gas contains a ventilator 8b for circulating the gas. A heat exchanger 8c is provided upstream of inlet 6a to bring the gas to the desired temperature before entry into crystallizer 6. Preferably, the gas is heated in heat exchanger 8c.

The circuit system of the drawing further comprises a barrier apparatus 8d (a valve, for example) to conduct a portion of the gas in a secondary circuit.

The circuit system of the drawing further contains a condenser 8e to remove cooling medium from the gas, absorbed by the gas during passage through crystallizer 6. Since, according to the present invention, little cooling medium transitions into crystallizer 6, the dimensions of condenser 8e can be comparatively small.

The apparatus of the drawing has a feed line 11 for inert gas, via which inert gas can be fed into the above-described circuit system from an inert gas tank (not illustrated) or be let off out of the circuit system. The gas is metered using a metering unit 12c, for example a control valve. Metering unit 12c is operated using a control unit 12a. Control unit 12a receives from the pressure sensors 12b and 12c values of the pressures in pellet dryer 4 and crystallizer 6 and uses these values to determine the need to open or close the metering unit 12c.

The present apparatus of the present invention is very useful for continuous pelletization and crystallization of a polymer, especially a polycondensate, preferably a polyester such as polyethylene terephthalate.

The invention claimed is:

1. An apparatus for continuous pelletization and crystallization of a polymer, the apparatus comprising:
a unit for forming a polymer pellet material and cooing the pellet material in a liquid cooling medium,
a unit for drying the pellet material which is connected to receive the pellet material from the unit for forming a pellet material,
wherein this unit for drying the pellet material comprises an exit opening for exporting gas,
said exit opening is located in an upper half of said unit for drying the pellet material,
a crystallizer for crystallizing the pellet material,
the crystallizer communicates, via a connection line, with the unit for drying the pellet material,
said connection line is provided in addition to the exit opening in said unit for drying the pellet material,
the crystallizer comprises an inlet for importing inert gas, and
the crystallizer communicates, via the inlet, with an inert gas tank so that a pressure in the crystallizer is increased relative to a pressure in the unit for drying the pellet material.

2. The apparatus according to claim 1, wherein the crystallizer further comprises an outlet for exporting inert gas.

3. The apparatus according to claim 1, wherein the apparatus comprises a control unit for setting a pressure in the crystallizer, wherein the pressure in the crystallizer is increased relative to an ascertained pressure in the unit for drying the pellet material.

4. The apparatus according to claim 1, wherein the unit for forming a polymer pellet material communicates with a reactor for producing a polymer melt.

5. The apparatus according to claim 2, wherein the inlet and outlet of the crystallizer for importing and exporting inert gas communicate with each other, via pipework fines, to form a closed-loop circuit system.

6. The apparatus according to claim 3, wherein the control unit communicates with a metering unit which is disposed in a feed line for inert gas into the crystallizer or the closed-loop circuit system of pipework lines.

7. The apparatus according to claim 3, wherein the control unit communicates with a sensor for determining the pressure in the crystallizer and with a sensor for determining the pressure in the unit for drying the pellet material.

8. The apparatus according to claim 1, wherein the unit for drying the pellet material and/or the connection line have a gas inlet for importation of air.

9. A process for continuous pelletization and crystallization of a polymer, the process comprising the steps of:
a) forming a polymer melt into pellet material and cooling the pellet material in a liquid cooling medium by adding a liquid cooling medium and cooling to a temperature above a glass transition temperature of the polymer before, during or after forming, in a unit for forming a polymer pellet material;
b) drying the pellet material by separating the liquid cooling medium from the pellet material in a first treatment space in a unit which is connected to receive the pellet material from the unit for forming the pellet material and which comprises an exit opening for exporting gas that is located in an upper half of said unit for drying the pellet material, at a temperature above the glass transition temperature of the polymer in a gas phase, wherein separated cooling medium transitions into the gas phase,
c) crystallizing the pellet material in an after-connected second treatment space in a crystallizer under an inert gas, wherein the crystallizer communicates, via a connection line, with the unit for drying the pellet material, and said connection line is provided in the unit for drying the pellet material in addition to the exit opening in said unit, and a pressure (p2) in the second treatment space is set to be above a pressure (p1) in the first treatment space.

10. The process according to claim 9, wherein the pressure (p1) in the first treatment space<the pressure (p2) in the second treatment space<the pressure (p1) in the first treatment space+100 mbar.

11. The process according to claim 9, wherein the pressure (p1) in the first treatment space<the pressure (p2) in the second treatment space<the pressure (p1) in the first treatment space+50 mbar.

12. The process according to claim 9, wherein an oxygen content of the first treatment space is more than 1% by weight.

13. The process according to claim 9, wherein an oxygen content of the first treatment space is more than 5% by weight.

14. The process according to claim 9, wherein an oxygen content of the first treatment space is more than 10% by weight.

15. The process according to claim 9, wherein an oxygen content of the second treatment space is less than 1% by weight.

16. The process according to claim 9, wherein an oxygen content of the second treatment space is less than 0.5% by weight.

17. The process according to claim 9, wherein an oxygen content of the second treatment space is less than 0.1% by weight.

18. The process according to claim 9, wherein step c) is adjoiningly followed by a step d) of thermal treatment of the crystallized pellet material in a third treatment space.

19. The process according to claim 18, wherein the thermal treatment comprises a de-aldehydization or a solid-state polymerization.

20. A process for retrofitting a plant for pelletization and crystallization of a polymer with a unit for drying pellet material and a crystallizer, wherein the crystallization of the polymer in the plant takes place under air, so that the retrofitted plant comprises an apparatus comprising:

a unit for forming a polymer pellet material and cooling the pellet material in a liquid cooling medium, a unit for driving the pellet material which is connected to receive the pellet material from the unit for forming a pellet material, wherein this unit for drying the pellet material comprises an exit opening for exporting gas, said exit opening is located in an upper half of said unit for drying the pellet material, a crystallizer for crystallizing the pellet material, the crystallizer communicates, via a connection line, with the unit for drying the pellet material, said connection line is provided in addition to the exit opening in said unit for drying the pellet material, the crystallizer comprises an inlet for importing inert gas, and the crystallizer communicates, via the inlet, with an inert gas tank so that a pressure in the crystallizer is increased relative to a pressure in the unit for drying the pellet material, said process comprising the steps of:

a) modifying the existing crystallizer in the plant for operation with an inert gas or alternatively providing an additional crystallizer which is equipped for operation with an inert gas, and b) additionally endowing the plant with a control unit for setting the pressure in the crystallizer, which control unit can be used to increase the pressure in the crystallizer relative to an ascertained pressure in the unit for drying the pellet material.

* * * * *